United States Patent
Bybell et al.

(10) Patent No.: US 7,558,948 B2
(45) Date of Patent: Jul. 7, 2009

(54) METHOD FOR PROVIDING ZERO OVERHEAD LOOPING USING CARRY CHAIN MASKING

(75) Inventors: Anthony J. Bybell, Carrboro, NC (US); Richard W. Doing, Raleigh, NC (US); David D. Dukro, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 96 days.

(21) Appl. No.: 10/946,465

(22) Filed: Sep. 20, 2004

(65) Prior Publication Data

US 2006/0095751 A1    May 4, 2006

(51) Int. Cl.
G06F 9/00    (2006.01)
G06F 9/44    (2006.01)
(52) U.S. Cl. ..................... 712/241; 712/224
(58) Field of Classification Search ................ 712/241, 712/224
See application file for complete search history.

(56) References Cited

U.S. PATENT DOCUMENTS

| | | | |
|---|---|---|---|
| 3,936,806 A * | 2/1976 | Batcher ................... | 712/10 |
| 4,228,520 A | 10/1980 | Letteney et al. | |
| 5,081,607 A | 1/1992 | Bates et al. | |
| 5,327,368 A | 7/1994 | Eustace et al. | |
| 5,689,228 A | 11/1997 | Yetter et al. | |
| 5,727,194 A * | 3/1998 | Shridhar et al. ........... | 712/241 |
| 5,801,719 A | 9/1998 | Jabbi et al. | |
| 5,898,602 A | 4/1999 | Rothman et al. | |
| 5,944,776 A | 8/1999 | Zhang et al. | |
| 6,201,409 B1 | 3/2001 | Jones et al. | |
| 6,367,071 B1 * | 4/2002 | Cao et al. ................. | 717/160 |
| 6,625,634 B1 | 9/2003 | Tremblay et al. | |
| 6,687,813 B1 * | 2/2004 | Norman et al. ............ | 712/241 |
| 7,065,636 B2 * | 6/2006 | Inoue et al. ............... | 712/241 |

(Continued)

FOREIGN PATENT DOCUMENTS

EP    0385568 A2    9/1990

(Continued)

OTHER PUBLICATIONS

IBM Technical Disclosure Bulletin, E.R. Barnes and V.G. Oklobdzija, *Method for Fast Carry-Propagation for VLSI Adders*, vol. 28, No. 4, Sep. 1985.

(Continued)

*Primary Examiner*—Eddie P Chan
*Assistant Examiner*—Idriss N Alrobaye
(74) *Attorney, Agent, or Firm*—Sawyer Law Group LLP

(57) ABSTRACT

A method for reducing overhead on a loop of a plurality of instructions is disclosed. The method includes providing a carry mask, the carry mask having a first value for the loop being performed at least the particular number of times minus one and a second value for at least a last instruction of the loop being performed a last time, providing addition logic, wherein the carry mask and a current instruction address of the plurality of instructions correspond to inputs of the addition logic and determining which of the plurality of instructions is to be executed using the carry mask to provide a resultant of the addition logic based on the carry mask and the current instruction address of the plurality of instructions.

9 Claims, 3 Drawing Sheets

U.S. PATENT DOCUMENTS

| | | | |
|---|---|---|---|
| 7,434,131 B2 * | 10/2008 | Mukherjee et al. | 714/733 |
| 2003/0200423 A1 * | 10/2003 | Ehlig et al. | 712/228 |
| 2004/0003219 A1 * | 1/2004 | Uehara | 712/241 |
| 2004/0193858 A1 * | 9/2004 | Ahmad et al. | 712/241 |
| 2006/0107028 A1 * | 5/2006 | Meuwissen et al. | 712/241 |

FOREIGN PATENT DOCUMENTS

| | | |
|---|---|---|
| JP | 3048330 A | 3/1991 |
| WO | WO 98/38740 | 9/1998 |

OTHER PUBLICATIONS

IBM Technical Disclosure Bulletin, R.M. Wade, *Fast Latched Circuit for Sum Formation,* vol. 9, No. 11, Apr. 1967.

IBM Technical Disclosure Bulletin, J.R. Levy and R.J. Savaglio, *Configurable 2\*\*N Power Incrementer,* vol. 31, No. 12, May 1989.

\* cited by examiner

METHOD FOR PROVIDING ZERO OVERHEAD LOOPING USING CARRY CHAIN MASKING

FIELD OF THE INVENTION

The present invention relates to a computer system, and more particularly to a method and system reducing overhead in a loop of instructions.

BACKGROUND OF THE INVENTION

Microprocessors routinely perform instruction loops. FIG. 1 depicts a conventional method 10 for performing an instruction loop. The method 10 is used for performing the loop one or more times. Generally, the instructions in the loop are performed more than once. FIG. 2 depicts a conventional system 50 that is used in performing the instruction loop. The conventional system 50 includes a conventional fetcher 52 and conventional addition logic 54. The conventional addition logic 54 calculates a next sequential address for an instruction in the loop which the fetcher 52 will get. In general, the conventional addition logic performs the operation $A_n$ XOR $B_n$ XOR $C_n$, where $A_n$ is the $n_{th}$ digit of the address for instruction that was just performed, $B_n$ is the $n^{th}$ digit of the number one (added to increment the address), and $C_n$ is the $n^{th}$ digit of the carry from the previous digit.

The conventional method 10 commences after the fetcher 50 has fetched a set of instructions in contiguous addresses. The current instruction is performed, via step 12. The first time the step 12 is performed, the current instruction is the first instruction in the loop. Consequently, the current address is the address of the first instruction. It is determined if the last instruction in the loop is the current instruction that was just performed, via step 14. If not, then the next instruction in the loop is set as the current instruction, via step 16. Step 16 includes determining the current address and using the instruction at that address as the current instruction. Thus, step 16 generally includes using the conventional addition logic 54 to add one to the address of the current instruction and then setting the instruction corresponding to the new address as the current instruction. It is determined if the loop has been performed the requisite number of times, via step 18. Step 18 thus determines whether the last iteration of the loop has just been performed. In one embodiment, step 18 determines if a count corresponding to the number of times the loop is to be performed is zero. Alternatively, step 18 might determine if the count corresponding to the number of times the loop is to be performed has reached that number. If the last iteration has been performed, then the conventional method 10 terminates. Otherwise, a count of the number of times the loop has been performed is adjusted, either by incrementing or by decrementing the count, via step 20. The method 10 branches to the first instruction in the loop, via step 22. Consequently, the conventional fetcher 52 is flushed, via step 24. The conventional fetcher 52 fetches a set of contiguous addresses that correspond to the first instructions in the loop, sets the current instruction as the first instruction and the current address as the address of the first instruction, via step 26. Step 12 is then returned to.

Although the conventional method 10 and system 50 function, one of ordinary skill in the art will readily recognize that the conventional method 10 and system 50 are inefficient. Each time the loop branches back to the first instruction, the conventional fetcher 52 is flushed. Flushing the conventional fetcher 52 generally requires two cycles. Thus, each time the loop is performed, there are approximately two dead cycles. As a result, the loop is less efficient than if there were one or zero dead cycles. For a short loop including a relatively small number of instructions, the dead cycles constitute a significant portion of the overhead for the loop. For example, if the loop includes four or two instructions, the flush of the conventional fetcher 52 consumes fifty to one hundred percent of the time used to perform the instructions in the loop. Such shorter loops are often used in computer systems. Consequently, the conventional method 10 and system 50 are relatively inefficient.

Accordingly, what are needed are a more efficient method and system for performing a loop, preferably multiple times. The present invention addresses such a need.

BRIEF SUMMARY OF THE INVENTION

The present invention provides a method and system for reducing overhead on a loop of a plurality of instructions. The loop is performed a particular number of times. The method and system comprise providing of a mask register and addition logic. The mask register provides a carry mask. The carry mask has a first value while the loop is being performed for at least the particular number of times minus one and a second value for at least a last instruction of the last iteration of the loop. Preferably, the second value of the carry mask is used for the entire final iteration of the loop. The addition logic is coupled with the mask register and determines which of the plurality of instructions is to be executed. The carry mask and a current instruction of the plurality of instructions correspond to inputs of the addition logic. In a preferred embodiment, the carry mask and the address of the current instruction are inputs to the addition logic. A resultant of the addition logic corresponds to a next instruction of the plurality of instructions unless the current instruction is the last instruction. The resultant of the addition logic corresponds to the first instruction if the current instruction is the last instruction and the loop is being performed less than the particular number of times.

According to the method and system disclosed herein, the present invention provides a more efficient mechanism for performing loops in a computer system.

DETAILED DESCRIPTION OF THE INVENTION

The present invention relates to computer systems. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

The present invention provides a method and system for reducing overhead on a loop of a plurality of instructions. The loop is performed a particular number of times. The method and system comprise providing a mask register and addition logic. The mask register provides a carry mask. The carry mask has a first value while the loop is being performed for at least the particular number of times minus one and a second value for at least a last instruction of the last iteration of the loop. Preferably, the second value of the carry mask is used for the entire final iteration of the loop. The addition logic is coupled with the mask register and determines which of the plurality of instructions is to be executed. The carry mask and a current instruction of the plurality of instructions correspond to inputs of the addition logic. A resultant of the addition logic corresponds to a next instruction of the plurality of instructions unless the current instruction is the last instruction. The resultant of the addition logic corresponds to the first instruction if the current instruction is the last instruction and the loop is being performed less than the particular number of times.

The present invention will be described in terms of a particular method having certain steps and a particular system. However, one of ordinary skill in the art will readily recognize that the present invention is fully applicable to a method having other and/or additional steps and a system having other and/or additional components not inconsistent with the present invention.

Figure 1:
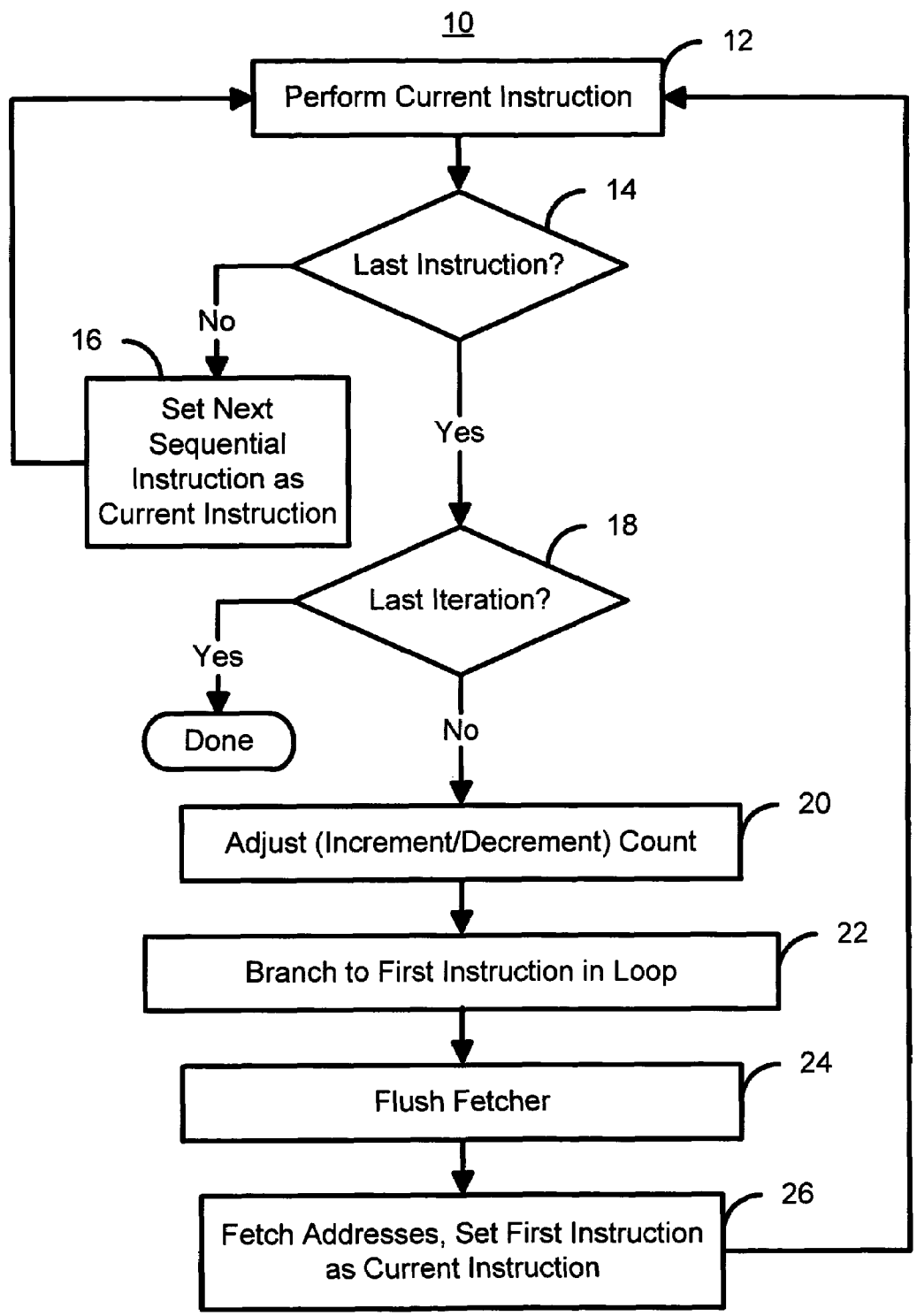
FIG. 1 is a flow chart of a conventional method for performing loops in a conventional computer system.
Figure 2:
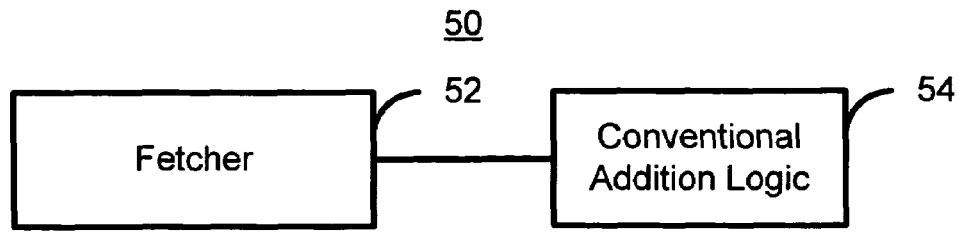
FIG. 2 is a block diagram depicting a conventional system used in performing loops in a computer system.
Figure 3:
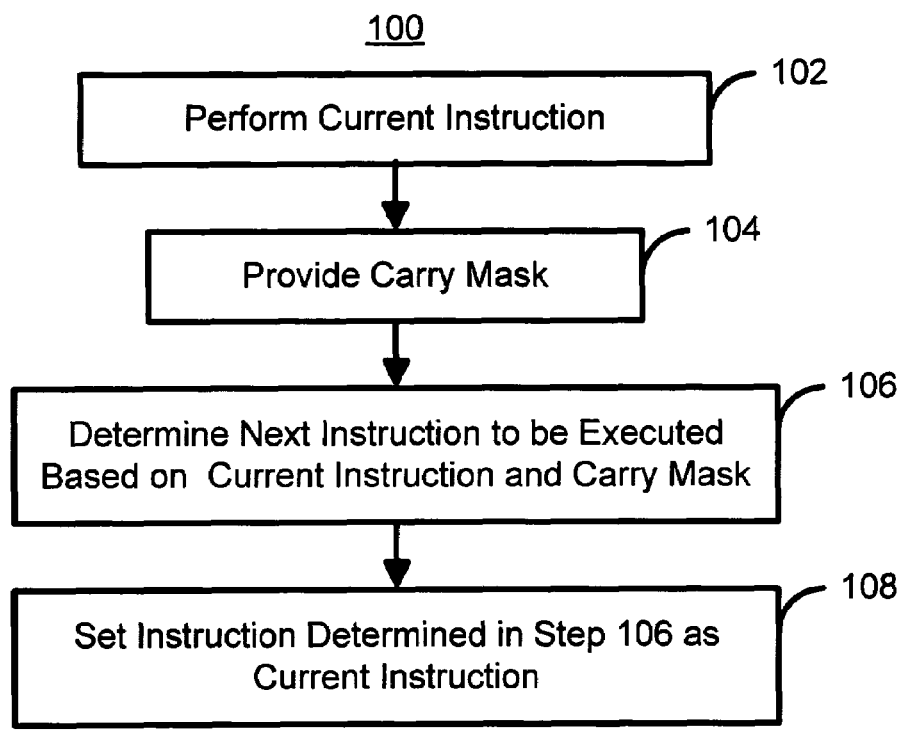
FIG. 3 is a high-level flow chart of one embodiment of a method in accordance with the present invention for performing loops in a computer system.

To more particularly describe the present invention, refer now to FIG. 3, depicting a high-level flow chart of one embodiment of a method 100 in accordance with the present invention for performing loops in a computer system. The method 100 preferably commences after at least the addresses for a first portion of the instructions for the loop have been fetched. The method 100 is preferably used in performing multiple iterations of the loop. A current instruction is performed, via step 102. A carry mask is provided, via step 104. The carry mask has a first value at least while the loop is being performed for one less iteration than the particular number of times. In other words, the carry mask has a first value at least until the last iteration of the loop. The carry mask has a second value for at least a last instruction of the last iteration of the loop. Preferably, the second value of the carry mask is used for the entire iteration of the loop. The first and second values are described below. It is determined which of the instructions in the loop is to be executed next using the current instruction performed in step 102 and the carry mask, via step 106. Step 106 provides a resultant based on the carry mask and the current instruction. The resultant corresponds to the next sequential address far the next instruction if the current instruction is not the last instruction in the loop. The resultant corresponds to the first address of the first instruction if the current instruction is the last instruction in the loop and the loop has been performed less than the desired number of times. Otherwise, the resultant preferably corresponds to a new instruction outside of the loop. In a preferred embodiment, the resultant is the address of a next sequential instruction unless the current instruction is the last instruction. Also in a preferred embodiment the resultant is the address of the first instruction if the current instruction is the last instruction and the loop is being performed less than the particular number of times. Thus, in a preferred embodiment, the mask includes 0' from the most significant bit of the address of the current instruction to all greater significant bits possible for the address and the 1' from the next most significant bit of the address of the last instruction to the least significant bit of the address of the current instruction. Also in a preferred embodiment, step 106 performs an addition such that a next sequential number is generated for the current instruction not being the last instruction in the loop. In a preferred embodiment step 106 performs the operation $A_n$ XOR$i_n$ XOR ($C_n$ AND $M_n$), where $A_n$ is $n^{th}$ bit of the address of the current instruction, $i_n$ is one for the least significant bit of the address of the current instruction and zero otherwise, $C_n$ is the carry bit for the $n^{th}$ digit and $M_n$ is the $n^{th}$ digit at the carry mask. The instruction corresponding to the address determined in step 106 is set as the current instruction, via step 108. Step 102 may then be returned to.

Using the method 100, the determining step 106 preferably provides the next sequential address for all instructions in the loop, except when the current instruction is the last instruction that has just been executed. In this case, step 106 returns the address of the first instruction if the last iteration of the loop has not been performed. If the last iteration of the loop has been performed, then step 106 provides a resultant that is preferably the address of a next instruction that is not part of the loop. Consequently, the method 100 automatically rolls the last address to the first address because of the use of the mask. As a result, when the first instruction is again fetched, the fetcher need not be flushed. The overhead of such a flush is thus saved. In a preferred embodiment, two cycles per iteration of the loop are saved. The savings in overhead for shorter loops, for example loops of 2 or 4 instructions, is particularly great. Moreover, it is noted that the number of instructions in the loop is a power of two. Consequently, for a loop naturally having a number of instructions that is not a power of two, additional padding may be provided to use the method 100.

Figure 4:
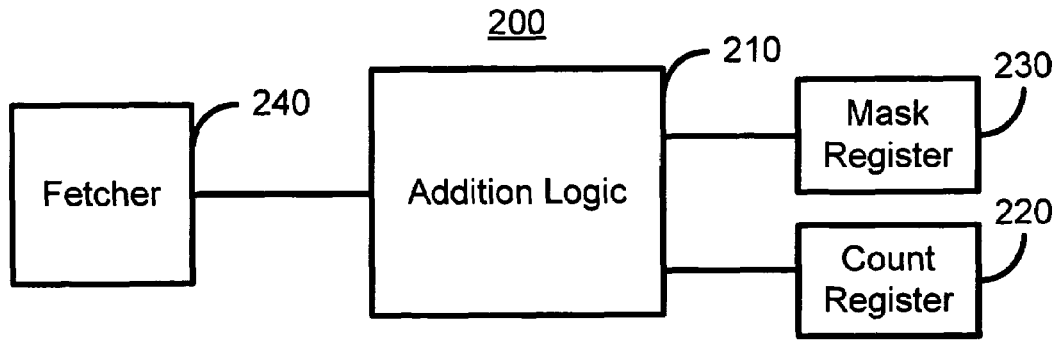
FIG. 4 is a block diagram of one embodiment of a system in accordance with the present invention used in performing loops in a computer system.

FIG. 4 depicts a block diagram of one embodiment of a system 200 in accordance with the present invention that is used in performing instruction loops in a computer system. The system 200 includes addition logic 210 and special purpose registers 220 and 230. Also shown is fetcher 240. The register 220 is a count register 220, while the register 230 is a mask register 230. The mask register 230 stores a carry mask for use by the addition logic 210. The mask register thus performs step 104, setting the carry mask to the appropriate value. The count register 220 is incremented or decremented such that the number of times the loop has been performed is tracked. As a result, the loop of instruction is performed a desired number of times, and the appropriate value of the carry mask can be determined. The addition logic 210 performs step 108 using the carry mask and a current instruction as inputs. Finally, the fetcher 240 utilizes the addresses determined by the addition logic 210, count register 220, and mask register 230 to fetch the appropriate instructions being performed for the loop.

Thus, the system 200 can be used in implementing the method 100. Consequently, the benefits of the method 100, particularly the reduction in overhead, can be achieved.

Figure 5:
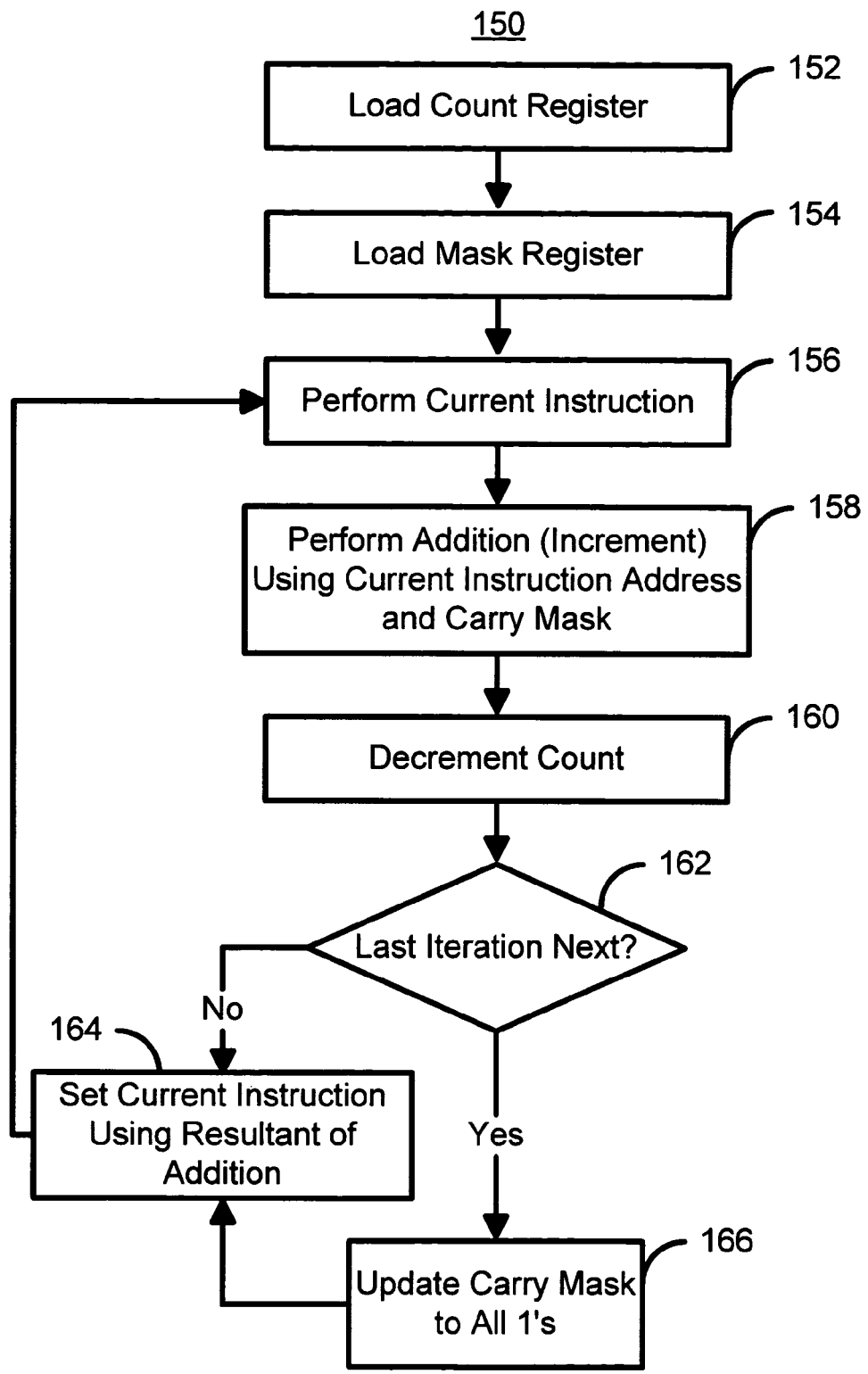
FIG. 5 is a more detailed flow chart of one embodiment of a method in accordance with the present invention for performing loops in a computer system.

FIG. 5 is a more detailed flow chart of one embodiment of a method 150 in accordance with the present invention for performing loops in a computer system. The method 150 is preferably performed using the system 200 of FIG. 4. Consequently, the method 150 is described in the context of the system 200. However, the method 150 could be performed using another system (not shown). Referring to FIGS. 4 and 5, the method 150 preferably commences after the contiguous addresses for at least the first portion of the instructions in the loop have been retrieved by the fetcher 240. Moreover, the number of instructions in the loop is a power of two. Consequently, the loop may be padded with additional instructions in order to ensure that the total number of instructions is a power of two.

The number of times the loop is desired to be performed minus one is placed in the count register 220, via step 152. Thus, in the method 150, the count is decremented, reaching zero for the last iteration. However, in an alternate embodiment, the count may be incremented. In such an embodiment, zero or one might be loaded into the count register 220. A first value of the carry mask is loaded into the mask register 230, via step 154. The first value of the carry mask is used by the addition logic 210 except for at least the last instruction of the last iteration of the loop. In a preferred embodiment, the second value of the carry mask is used for the entire last iteration of the loop. Because of the configuration of the mask, the first value of the carry mask and the second value of the carry mask are the same from the least significant bit to the next to most significant bit of the address of the last instruction. Consequently, the first and second values of the carry mask have the same effect for up to the most significant bit of the address for the last instruction.

A current instruction in the loop is performed, via step 156. The first time step 156 is performed, the first instruction in the loop is performed. An addition is performed by the addition logic 210 using the address of the current instruction, one, and the carry mask from the mask register 230, via step 158. Thus, step 158 increments the address, except for the carry mask. Step 158 preferably performs the operation $A_n$ XOR $i_n$ XOR ($C_n$ AND $M_n$), preferably in the addition logic 210. Except for the last iteration of the loop, the carry mask has a logical 0 in the most significant digit of the highest address in the loop (typically the address of the last instruction) and above, and a 1 in each digit from the least significant digit to the next to most significant digit of the highest address. Thus, step 158 results in the address of the next sequential instruction until the current instruction is the last instruction of the loop. For the last instruction of the loop, the resultant of step 158 is the address of the first instruction in the loop. Consequently, step 158 automatically wraps the addresses back around to the first address in the loop. The count is then decremented in step 160.

It is determined whether the last iteration of the loop is the next iteration, via step 162. In a preferred embodiment, step 162 does so by determining whether the count has been decremented to zero. If the last iteration of the loop is not next, then the instruction for the address calculated in step 158 is set as the current instruction, via step 164. If the last iteration of the loop is the next, then the carry mask is updated to be all ones, via step 166. Step 164 is then returned to. In FIG. 5, it is indicated that step 156 is returned to. However, the current instruction is executed as step 156 is returned to except for the last iteration of the loop. In this case, the resultant of step 158 is an address of an instruction that is not in the loop. Consequently, in such a case, the instruction having the address determined in step 158 is performed. However, this instruction is not part of the loop. Consequently, the method 150 can be considered to terminate and the next instruction performed.

Using the method 150, the determining step 158 provides the next sequential address for all instructions in the loop, except when the current instruction is the last instruction that has just been executed. In this case, step 158 returns the address of the first instruction if the last iteration of the loop has not been performed. If the last iteration of the loop has been performed, then step 158 provides a resultant that corresponds to a next instruction that is not part of the loop. Consequently, the method 150 automatically rolls the last address to the first address because of the use of the mask. As a result, when the first instruction is again fetched, the fetcher need not be flushed. The overhead of such a flush is thus saved. In a preferred embodiment, two cycles per iteration of the loop are saved. The savings in overhead for shorter loops, for example loops of 2 or 4 instructions, is particularly great. Moreover, it is noted that the number of instructions in the loop is a power of two. Consequently, for a loop naturally having a number of instructions that is not a power of two, additional padding may be provided to use the method 150.

A method and system for more efficiently performing a loop of instructions have been disclosed. The present invention has been described in accordance with the embodiments shown, and one of ordinary skill in the art will readily recognize that there could be variations to the embodiments, and any variations would be within the spirit and scope of the present invention. Software written according to the present invention is to be stored in some form of computer-readable medium, such as memory, CD-ROM or transmitted over a network, and executed by a processor. Consequently, a computer-readable medium is intended to include a computer readable signal, which, for example, may be transmitted over a network. Accordingly, many modifications may be made by one of ordinary skill in the art without departing from the spirit and scope of the appended claims.

We claim:

1. A method for reducing overhead on a loop of a plurality of instructions, the loop being performed a particular number of times, the method comprising:

providing a carry mask, the carry mask having a first value for the loop being performed at least the particular number of times minus one and a second value for at least a last instruction of the loop being performed a last time;

providing addition logic, wherein the carry mask and a current instruction address of the plurality of instructions correspond to inputs of the addition logic; and determining which of the plurality of instructions is to be executed using the carry mask to provide a resultant of the addition logic based on the carry mask and the current instruction address of the plurality of instructions by performing the operation $A_n$ XOR $i_n$ XOR ($C_n$ AND $M_n$), where $A_n$ is a $n^{th}$ bit of the current instruction address, $i_n$ is one for a least significant bit of the address of the current instuction and zero otherwise, $C_n$ is a carry bit for a $n^{th}$ digit of the carry mask and $M_n$ is a $n^{th}$ digit of the carry mask, the resultant of the addition logic corresponding to a next instruction of the plurality of instructions if the current instruction is not a last instruction, the resultant of the addition logic corresponding to an address of a first instruction if the current instruction is not a last instruction, the resultant of the addition logic corresponding to an address of a first instruction if the current instruction address is the last instruction and the loop being performed less than the particular number of times.

2. The method of claim 1 wherein each of the plurality of instructions has an address.

3. The method of claim 2 wherein the determining step provides the resultant of the addition logic using the carry mask and the address of the current instruction.

4. The method of claim 3 wherein the first value of the carry mask includes at least one one and at least one zero, the at least one zero in each of a first portion of a plurality of bit positions higher than or equal to a most significant bit of the address of the last instruction and the at least one one in each of a second portion of the plurality of bit positions less than the most significant bit of the address of the last instruction.

5. The method of claim 3 wherein the second value of the carry mask includes the at least one one in each of the plurality of bit positions.

6. The method of claim 5 wherein the determining steps performs the address of the current instruction XOR one XOR (the carry mask AND a carry).

7. The method of claim 1 wherein the plurality of instructions includes a number of instructions, the number of instruction being equal to a power of two.

8. The method of claim 1 further comprising:
storing a count of a number of times the loop has been performed.

9. The method of claim 1 wherein the address of the current instruction of the plurality of instructions corresponds to one of the current instruction of the plurality of instructions corresponds to one of the inputs of the addition logic, the addition logic using the address of the current instruction to determine which of the plurality of instructions is to be executed.

* * * * *